United States Patent
Dreyer et al.

(10) Patent No.: US 10,031,689 B2
(45) Date of Patent: Jul. 24, 2018

(54) STREAM MANAGEMENT FOR STORAGE DEVICES

(71) Applicant: Western Digital Technologies, Inc., Irvine, CA (US)

(72) Inventors: David George Dreyer, Rochester, MN (US); Adam Espeseth, Rochester, MN (US)

(73) Assignee: Western Digital Technologies, Inc., San Jose, CA (US)

(*) Notice: Subject to any disclaimer, the term of this patent is extended or adjusted under 35 U.S.C. 154(b) by 70 days.

(21) Appl. No.: 15/266,690

(22) Filed: Sep. 15, 2016

(65) Prior Publication Data

US 2018/0074709 A1 Mar. 15, 2018

(51) Int. Cl.
*G06F 12/00* (2006.01)
*G06F 13/00* (2006.01)
(Continued)

(52) U.S. Cl.
CPC .......... *G06F 3/064* (2013.01); *G06F 3/061* (2013.01); *G06F 3/0653* (2013.01);
(Continued)

(58) Field of Classification Search
CPC ........... G06F 3/00; G06F 3/06–3/0608; G06F 3/061; G06F 3/0611–3/0638; G06F 3/064; G06F 3/0641–3/0653; G06F 3/0655–3/0688; G06F 3/0689; G06F 11/00–11/3696; G06F 12/00–12/16; G06F 13/14–13/4063; G06F 13/4068–13/4095;
(Continued)

(56) References Cited

U.S. PATENT DOCUMENTS

| 5,481,694 A | * | 1/1996 | Chao | G06F 3/0601 711/112 |
| 6,542,960 B1 | * | 4/2003 | Wong | G06F 11/1076 711/114 |

(Continued)

OTHER PUBLICATIONS

Block2Vec: A Deep Learning Strategy on Mining Block Correlations in Storage Systems; Dai et al.; 45th International Conference on Parallel Processing Workshops; Aug. 16-19, 2016; pp. 230-239 (Year: 2016).*

(Continued)

*Primary Examiner* — Daniel C Chapell
(74) *Attorney, Agent, or Firm* — Foley & Lardner LLP (57) ABSTRACT

In general, techniques are described for stream management in storage devices. A storage device comprising a memory device and a processor may be configured to perform the techniques. The processor may detect a stream collision in which a host device writes a first version of a logical block (LB) to a first stream, and writes a second version of the same LB to a second stream. The processors may compare a first blockset sequence number (BSN) associated with a first collection of physical blocks referenced by the first stream to a second BSN associated with a second collection of physical blocks referenced by the second stream. Based on the comparison of the first BSN to the second BSN, the processor may write, to the mem device, the second version of the LB to the first stream.

20 Claims, 5 Drawing Sheets

(51) Int. Cl.
*G06F 13/28* (2006.01)
*G06F 3/06* (2006.01)
*G06F 13/40* (2006.01)

(52) U.S. Cl.
CPC ........ *G06F 3/0688* (2013.01); *G06F 13/4068* (2013.01); *G06F 2213/0026* (2013.01)

(58) Field of Classification Search
CPC .......................... G06F 17/30–17/30997; G06F 2201/00–2201/885; G06F 2206/00–2206/20; G06F 2211/00–2211/902; G06F 2212/00–2212/7211; G06F 2213/00–2213/0026; G06F 2213/0028–2213/4004
See application file for complete search history.

(56) References Cited

U.S. PATENT DOCUMENTS

| | | | |
|---|---|---|---|
| 7,669,086 B2 | 2/2010 | Gower et al. | |
| 8,850,145 B1* | 9/2014 | Haase | G06F 17/30 711/162 |
| 9,037,820 B2 | 5/2015 | Ratn et al. | |
| 9,213,633 B2* | 12/2015 | Canepa | G06F 12/0246 |
| 9,703,590 B2* | 7/2017 | Kamino | G06F 9/45558 |
| 2012/0317337 A1 | 12/2012 | Johar et al. | |
| 2013/0159626 A1* | 6/2013 | Katz | G06F 3/0608 711/119 |
| 2013/0185532 A1* | 7/2013 | Flynn | G06F 3/061 711/162 |
| 2014/0156967 A1 | 6/2014 | Meir | |
| 2014/0372698 A1* | 12/2014 | Lee | G06F 3/06 711/114 |
| 2015/0074337 A1* | 3/2015 | Jo | G06F 12/0246 711/103 |
| 2015/0074665 A1* | 3/2015 | Kamino | G06F 13/4027 718/1 |
| 2015/0134796 A1 | 5/2015 | Theimer et al. | |
| 2015/0286524 A1* | 10/2015 | Trantham | G06F 11/108 714/766 |
| 2016/0092116 A1 | 3/2016 | Liu et al. | |
| 2016/0246521 A1* | 8/2016 | Dewitt | G06F 3/061 |
| 2016/0283125 A1* | 9/2016 | Hashimoto | G06F 17/30123 |
| 2017/0017663 A1* | 1/2017 | Huo | G06F 3/0619 |
| 2017/0046068 A1* | 2/2017 | Tan | G06F 3/0679 |
| 2017/0075827 A1* | 3/2017 | Ward | G06F 13/1668 |
| 2017/0090756 A1* | 3/2017 | Sato | G06F 3/061 |
| 2017/0153848 A1* | 6/2017 | Martineau | G06F 3/061 |

OTHER PUBLICATIONS

A caching policy for continuous media objects based on logical caches and object partitioning; Park et al.; International Conference on Parallel Processing; Sep. 3-7, 2001; pp. 259-266 (Year: 2001).*
The MultiStream protocol: a highly flexible high-speed transport protocol; La Porta et al.; IEEE Journal on Selected Areas in Communications, vol. 11, iss. 4; May 1993; pp. 519-530 (Year: 1993).*
Kang et al., "The Multi-streamed Solid-State Drive", 2014 USENIX Federated Conferences, Jun. 17-20, 2014, 5 pgs.
Samsung, Multi-Stream SS Technology, Aug. 2015, Retrieved from http://www.samsung.com/semiconductor/global/file/insight/2015/12/0_storage-intelligence-prodoverview-2015-0.pdf, 2 pgs.
NVM Express, Revision 1.1, Specification, Oct. 11, 2012, 163 pgs.

* cited by examiner

STREAM MANAGEMENT FOR STORAGE DEVICES

TECHNICAL FIELD

The disclosure generally relates to storage devices.

BACKGROUND

A host device may interface with one or more storage devices in accordance with one or more interface specifications. An example general interface specification for interfacing with a variety of storage devices includes a peripheral component interconnect express (PCIe) interface specification. The host may, in the example of PCIe, employ a logical interface referred to as non-volatile memory (NVM) express (NVMe) interface specification to further facilitate the exchange of data between the host and a particular type of storage device referred to as a solid-state drive (SSD).

NVMe allows for either the host or the SSD to define streams to facilitate efficient operation of the SSD. A stream generally refers to a collection of write data directed to one or more unique collection of physical blocks within the SSD, where such collections of physical blocks may also be referred to as a "blockset." Blocksets may, in this respect, refer to a collection of physical blocks that are written, garbage collected, and erased as a group.

Streams may facilitate operation of the SSD by allowing for data with similar or the same velocities (or, in other words, lifetimes) to be stored to the same blockset. When data with different velocities is stored to the same blockset, the SSD may, when performing garbage collection for example, erase a portion of the blockset having high velocity (or, in other words, short lifetime) data and move the remaining portion to a different blockset, thereby increasing write amplification and reducing SSD write and read throughput. Organizing data with similar or the same velocities using streams may thereby allow the SSD to potentially reduce the impact of garbage collection (and thus write amplification) while also potentially increasing SSD read and write performance.

SUMMARY

In one example, techniques of this disclosure are directed to a method comprising detecting, by a storage device, a stream collision in which a host device writes a first version of a logical block (LB) to a first stream, and writes a second version of the same LB to a second stream, the first stream referencing a first collection of physical blocks of the storage device, and the second stream referencing a second collection of physical blocks of the storage device. The method also comprises comparing, by the storage device, a first blockset sequence number (BSN) associated with the first collection of physical blocks to a second BSN associated with the second collection of physical blocks. The method further comprises writing, by the storage device, the second version of the LB to the first stream based on the comparison of the first BSN to the second BSN.

In another example, techniques of this disclosure are directed to a storage device comprising a memory device, and one or more processors. The one or more processors may be configured to detect a stream collision in which a host device writes a first version of a logical block (LB) to a first stream, and writes a second version of the same LB to a second stream, the first stream referencing a first collection of physical blocks of the memory device, and the second stream referencing a second collection of physical blocks of the memory device. The one or more processors may further be configured to compare a first blockset sequence number (BSN) associated with the first collection of physical blocks to a second BSN associated with the second collection of physical blocks. The one or more processors may also be configured to write, to the mem device, the second version of the LB to the first stream based on the comparison of the first BSN to the second BSN.

In another example, techniques of this disclosure are directed to a non-transitory computer-readable storage medium encoded with instructions that, when executed, cause one or more processors of a storage device to detect a stream collision in which a host device writes a first version of a logical block (LB) to a first stream, and writes a second version of the same LB to a second stream, the first stream referencing a first collection of physical blocks of the storage device, and the second stream referencing a second collection of physical blocks of the storage device, compare a first blockset sequence number (BSN) associated with the first collection of physical blocks to a second BSN associated with the second collection of physical blocks, and write the second version of the LB to the first stream based on the comparison of the first BSN to the second BSN.

The details of one or more examples of various aspects of the techniques are set forth in the accompanying drawings and the description below. Other features, objects, and advantages of the techniques set forth in this disclosure will be apparent from the description and drawings, and from the claims.

DETAILED DESCRIPTION

Figure 1:
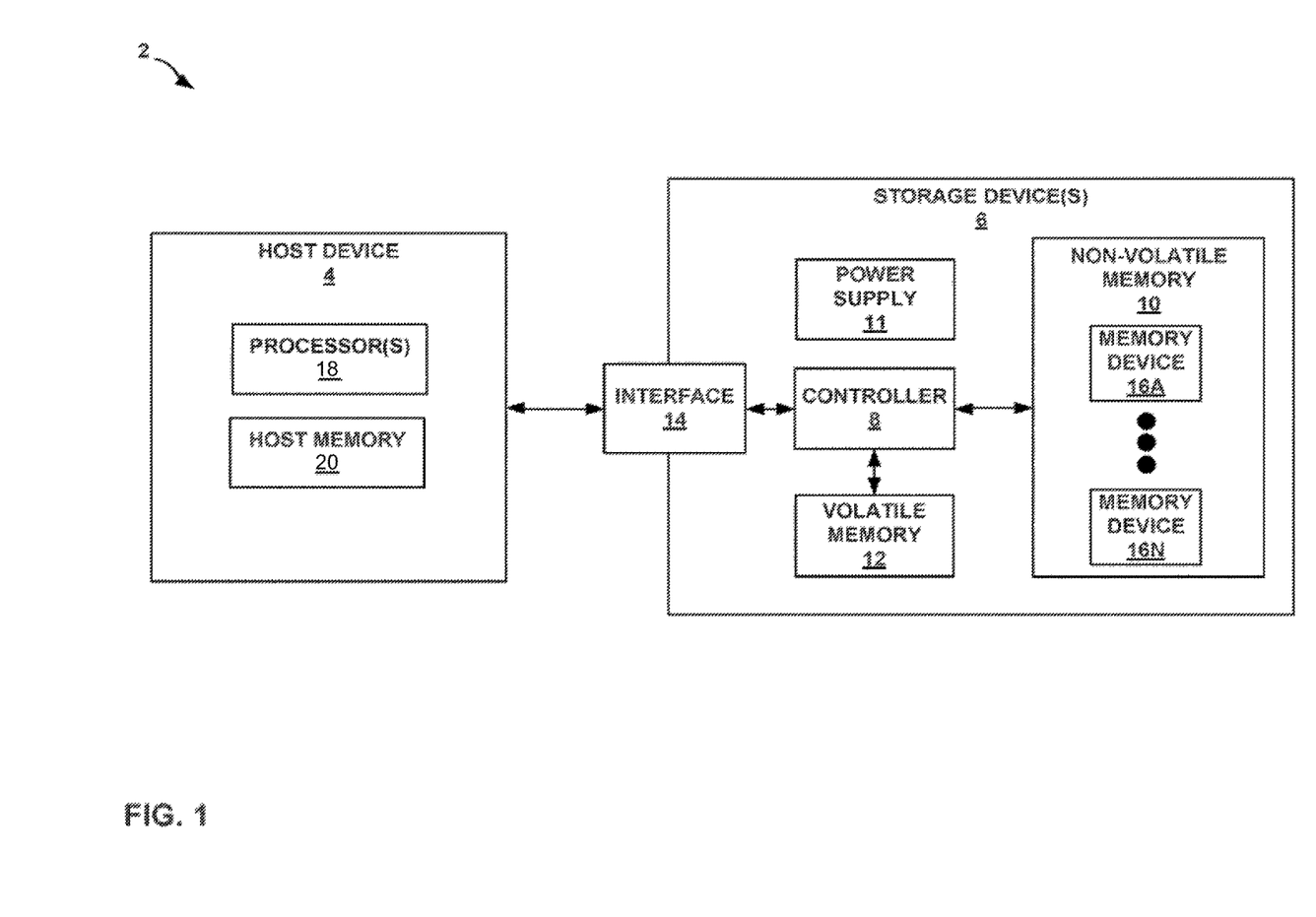
FIG. 1 is a conceptual and schematic block diagram illustrating an example storage environment in which a storage device may interact with a host device, in accordance with one or more techniques of this disclosure.

FIG. 1 is a conceptual and schematic block diagram illustrating an example storage environment 2 in which storage device 6 may function as a storage device for host device 4, in accordance with one or more techniques of this disclosure. For instance, host device 4 which may store data to and/or retrieve data from one or more storage devices 6. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Host device 4 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 4 may include at least one processor 18 and host memory 20. At least one processor 18 may include any form of hardware capable of processing data and may include a general purpose processing unit (such as a central processing unit (CPU)), dedicated hardware (such as an application specific integrated circuit (ASIC)), configurable hardware (such as a field programmable gate array (FPGA)), or any other form of processing unit configured by way of software instructions, microcode, firmware, or the like. Host memory 20 may be used by host device 4 to store information (e.g., temporarily store information). In some examples, host memory 20 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

As illustrated in FIG. 1, storage device 6 may include controller 8, non-volatile memory 10 (NVM 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces electrically interconnecting components of storage device 6, or the like.

In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.), M.2, or the like. In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, as described in more detail with reference to FIG. 2-4, interface 14 may operate according to the Non-Volatile Memory Express (NVMe) protocol. However, in other examples, the techniques of this disclosure may apply to an interface 14 that operates in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), PCI-express, or the like. The interface 14 (e.g., the data bus, the control bus, or both) is electrically connected to controller 8, providing a communication channel between host device 4 and controller 8, allowing data to be exchanged between host device 4 and controller 8. In some examples, the electrical connection of interface 14 may also permit storage device 6 to receive power from host device 4.

Storage device 6 may include volatile memory 12, which may be used by controller 8 to store information. In some examples, controller 8 may use volatile memory 12 as a cache. For instance, controller 8 may store cached information in volatile memory 12 until the cached information is written NVM 10. Volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Storage device 6 includes NVM 10, which includes a plurality of memory devices 16A-16N (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 16 may be referred to as a die. A single physical chip may, as one example, include a plurality of dies (i.e., a plurality of memory devices 16). Each of memory devices 16 may be configured to store relatively large amounts of data (e.g., 128 MB, 512 MB, 1 GB, 4 GB, 16 GB, 64 GB, 128 GB, 512 GB, 1 TB, etc.).

NVM 10 may include any type of non-volatile memory devices. Some examples of NVM 10 include, but are not limited to flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Storage device 6 includes controller 8, which may manage one or more operations of storage device 6. For instance, controller 8 may manage the reading of data from and/or the writing of data to memory devices 16. Controller 8 may represent one of or a combination of one or more of a microprocessor, digital signal processor (DSP), application specific integrated circuit (ASIC), field programmable gate array (FPGA), or other digital logic circuitry.

As described above, host device 4 may interface with storage device 6 in accordance with one or more interface protocols, which may be defined by interface specifications. An example general interface specification for interfacing with a variety of different types of storage devices includes the PCIe interface specification. Host device 4 may, in the example of PCIe, employ a logical interface referred to as non-volatile memory (NVM) express (NVMe) interface specification to further facilitate the exchange of data between host device 4 and a particular type of storage device 6 referred to as a solid-state drive (SSD). In this example, storage device 6 may be referred to as SSD 6.

NVMe allows for either host device 4 or SSD 6 to define streams to facilitate efficient operation of SSD 6. A stream generally refers to a collection of write data directed to one or more unique collection of physical blocks within the SSD, where such collections of physical blocks may also be referred to as a "blockset." Blocksets may, in this respect, refer to a collection of physical blocks that are written, garbage collected, and erased as a group.

Streams may facilitate operation of SSD 6 by allowing for data with similar or the same velocities (or, in other words, lifetimes) to be stored to the same blockset. When data with different velocities is stored to the same blockset, SSD 6 may, when performing garbage collection for example, erase a portion of the blockset having high velocity (or, in other words, short lifetime) data and move the remaining portion to a different blockset, thereby increasing write amplification and reducing SSD 6 write and read throughput. Organizing data with similar or the same velocities using streams may thereby allow SSD 6 to potentially reduce the impact of garbage collection (e.g., write amplification) while also potentially increasing read and write performance of SSD 6 considering that the entire blockset can be deleted at the same time without moving any portions of the blockset.

Efficient operation of SSD 6 through use of streams may, however, be predicated upon proper use of such streams. So-called "stream collisions" may occur whereby host device 4 writes a first version of a logical block address (LBA) to a first stream and then writes, while the blockset associated with the first stream is still open, a second version of the LBA to a second stream with an earlier time of origin. Streams associated with blocksets having an earlier time of origin may be identified by BSNs with a lower number in comparison to streams associated with blocksets having a higher relative BSN. The streams collide in a temporal sense, whereby during replay to reconstruct an indirection table after rebooting or otherwise re-initializing SSD 6, SSD 6 is unable to determine whether the first version of the LBA or the second version of the LBA is the most recent version. SSD 6 may, when improperly assuming that the first version is the most recent version of the LBA during replay, lose the second more recent version of the LBA.

In accordance with the techniques described in this disclosure, controller 8 of SSD 6 may detect stream collisions at the time of the data write and seamlessly manage the writes to the colliding streams (meaning, without host 4 being aware or informed of such stream collision) so as to potentially avoid limiting stream operation by host 4. That is, rather than indicate in interface protocols (or specifications) that host 4 should avoid stream collisions and/or that controller 8 may return a stream collision exceptions informing host 4 of such collisions, the techniques of this disclosure enable controller 8 to seamlessly handle such stream collisions and thereby potentially avoid limiting host 4 operation.

In addition to removing restrictions on host 4, seamless handling of stream collisions promotes more efficient operation of SSD 6 in certain architectures. While stream collisions are implicitly handled in SSDs featuring robust indirection systems (such as those that use a "snapshots," replay tokens or a purely chronological replay journal), these robust indirection systems are resource intensive in terms of consuming significant amounts of memory and/or processor cycles. Controller 8 of SSD 6 may implement the stream handling techniques of this disclosure in conjunction with a less resource intense indirection system that stores indirection information in-line with user data. The indirection system of SSD 6 may utilize less resources while controller 8 may implement the seamless stream management techniques of this disclosure to account for stream collisions that the less intensive indirection system of SSD 6 may be unable to handle, thereby offering the benefits of a more robust indirection system while consuming less resources than the more robust indirection systems.

In operation, controller 8 may detect a stream collision in which host 4 writes a first version of a logical block (LB) to a first stream, and writes a second version of the same LB to a second stream prior to closing the first stream. The stream collision may occur in any one of three ways. First, a stream collision may occur when host 4 writes a LB to an open stream and then writes the same LB to another open stream prior to the first stream being closed. Second, a stream collision may occur when host 4 writes a LB to an open stream and then writes the same LB without specifying a stream prior the first stream being closed (effectively, writing a LB to a second stream prior to closing the first stream). Third, host 4 may write a LB to without specifying a stream while a stream is open and then write the same LB to the open stream (effectively, writing a LB to a second stream prior to closing the first stream).

Controller 8 may seamlessly handle the stream collision by, at least in part, comparing a first blockset sequence number (BSN) associated with a first collection of physical blocks (or, in other words, blockset) referenced by the first stream and a second BSN associated with a second collection of physical blocks referenced by the second stream. Controller 8 may store, to an indirection table, the first BSN associated with the first blockset, and access the indirection table using a LB address (LBA) associated with the LB to retrieve the first BSN. Controller 8 may determine the second BSN based on an association between the second BSN and the second stream (which may be identified by a stream identifier sent from the host), which may be stored to some form of data structure (such as a table).

Controller 8 may, based on the comparison of the first BSN to the second BSN, write the second version of the LB to the first stream, effectively contradicting the original write from host 4 that the second version of the LB is to be written to the second stream (and avoiding the stream collision resulting from the original write). When, for example, the first BSN is greater than or equal to the second BSN, controller 8 may write the second version of the LB to the first stream to avoid the stream collision. When, for example, the first BSN is less than the second BSN, controller 8 may write the LB to the second stream, as there is no stream collision.

To allow controller 8 to determine to which open stream the second version of the LBA is to be written when the first BSN is greater than or equal to the second BSN, controller 8 may store, in some form of a data structure (e.g., a table), an association between the first BSN and the first stream (which may be identified by a first stream identifier). Controller 8 may access this data structure to determine the first stream identifier prior to writing the second version of the LBA to the first stream identifier.

Although described in the above example as writing the LB to the first stream when the first BSN is greater than or equal to the second BSN and writing the LB to the second stream when the first BSN is less than the second BSN, the techniques may be implemented with respect to any fixed comparison rules. In other words, it should be appreciated that the various greater than or equal, greater than, less than, or less than or equal comparisons may be equally formed based on the BSN in such a manner as to all allow for a fixed and seamless way by which to address stream collisions. The techniques of this disclosure should therefore not be limited to the example described above.

Figure 2:
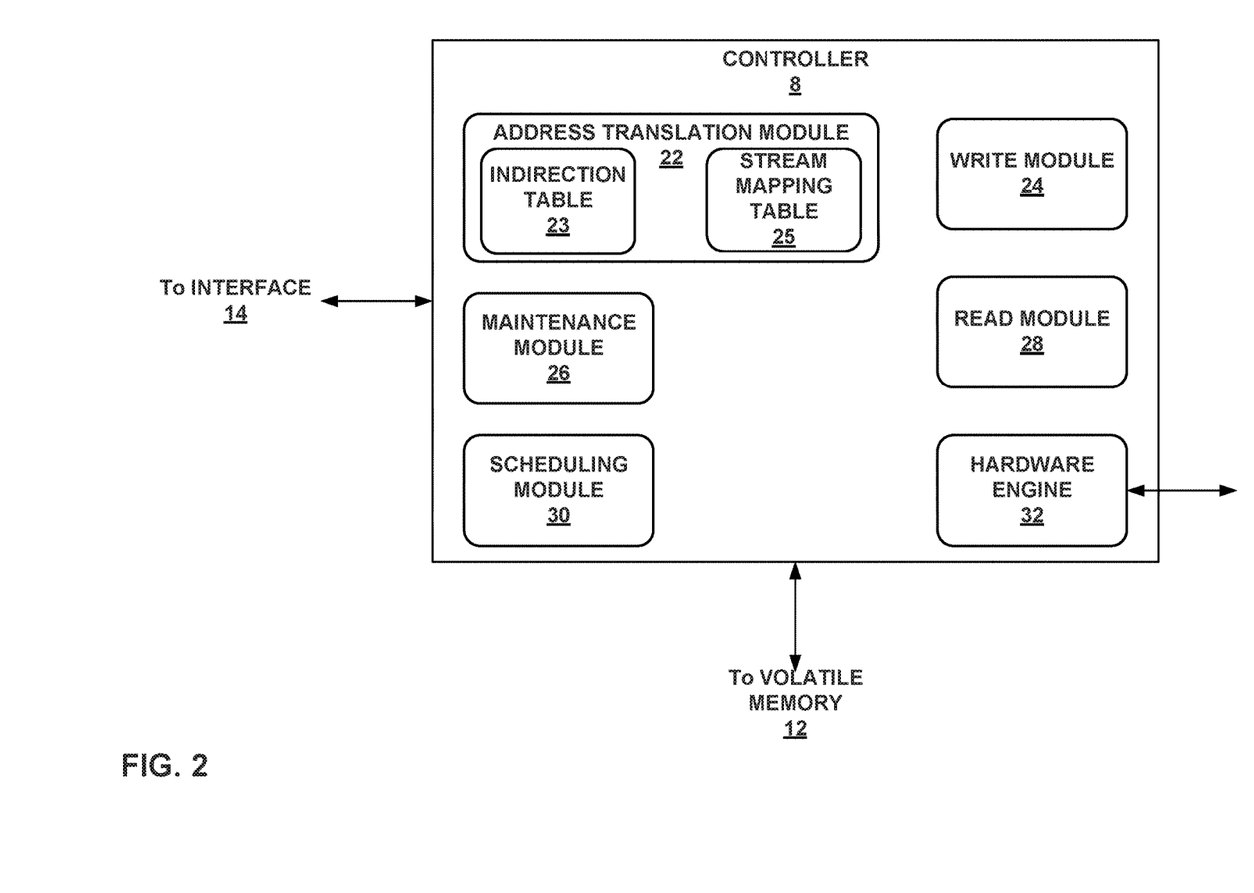
FIG. 2 is a conceptual and schematic block diagram illustrating an example storage environment in which a storage device may interact with a host device, in accordance with one or more techniques of this disclosure.

FIG. 2 is a conceptual and schematic block diagram illustrating example details of controller 8. In some examples, controller 8 may include an address translation module 22, a write module 24, a maintenance module 26, a read module 28, a scheduling module 30, and a hardware engine. In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with the host device 4 via interface 14 and manage the storage of data to and the retrieval of data from memory devices 16. For example, write module 24 of controller 8 may manage writes to memory devices 16. Write module 24 may receive a message from host device 4 via interface 14 instructing storage device 6 to store data associated with a logical data address and the data. Write module 24 may manage writing of the data to memory devices 16.

For example, write module 24 may communicate with address translation module 22, which manages translation between logical data addresses used by host device 4 to manage storage locations of data and physical data addresses used by write module 24 to direct writing of data to memory devices 16. Address translation module 22 of controller 8 may utilize an indirection table 23 that associates logical block addresses of logical blocks to physical block addresses of physical blocks stored by memory devices 16. For example, host device 4 may utilize the logical block addresses of the logical blocks in instructions or messages to storage device 6, while write module 24 utilizes physical block addresses of the corresponding physical blocks to control writing of data to memory devices 16. (Similarly, read module 28 may utilize physical block addresses to control reading of blocks from memory devices 16.) The physical block addresses correspond to actual, physical locations of blocks of memory devices 16. In some examples, address translation module 22 may store indirection table 23 in volatile memory 12 shown in the example of FIG. 1.

In this way, host device 4 may be allowed to use a static logical block address for a certain set of data, while the physical block address at which the data is actually stored in memory devices 16 may change. Address translation module 22 may maintain indirection table 23 to map the logical block addresses to physical block addresses to allow use of the static logical block address by the host device 4 while the physical block address of the data may change, e.g., due to wear leveling, garbage collection, write operations (such as those involved in shingled magnetic recording (SMR) HDDs or SSDs) or the like. In some examples, indirection table 23 may be a single layer table, such that by applying a hash to a logical block address received from host device 4, address translation module 22 may directly retrieve a corresponding physical block address.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices 16 that include the selected blocks to actually store the data. As discussed above, write module 24 may cause address translation module 22 to update indirection table 23 based on the selected blocks. For instance, write module 24 may receive a message from host device 4 that includes a unit of data and a logical data address, select a block and page within a particular memory device of memory devices 16 to store the data, cause the particular memory device of memory devices 16 to actually store the data (e.g., via one of channel controllers 32 that corresponds to the particular one of memory devices 16), and cause address translation module 22 to update indirection table 23 to indicate that the logical block address corresponds to the selected physical block address within the particular one of memory devices 16.

In some examples, in addition to causing the data to be stored by memory devices 16, write module 24 may cause memory devices 16 to store information which may be used to recover the unit of data should one or more of the blocks fail or become corrupted. The parity information may be used to recover the data stored by other blocks. In some examples, the parity information may be an XOR of the data stored by the other blocks.

Responsive to receiving a write command from host device 4, write module 24 may determine at which physical locations (e.g., blocks or sectors) of memory devices 16 to write the data. For example, write module 24 may request from address translation module 22 or maintenance module 26 one or more physical block addresses that are empty (e.g., store no data), partially empty (e.g., only some physical containers store data), or store at least some invalid (or stale) data. Upon receiving the one or more physical block addresses, write module 24 may select one or more blocks as discussed above, and communicate a message that causes hardware engine 32 to write the data to the selected blocks.

Read module 28 similarly may control reading of data from memory devices 16. For example, read module 28 may receive a message from host device 4 requesting data with an associated logical block address. Address translation module 22 may convert the logical block address to a physical block address using indirection table 23. Read module 28 then may control hardware engine 32 to retrieve the data from the physical block address corresponding to the requested logical block address.

Maintenance module 26 may be configured to perform operations related to maintaining performance and extending the useful life of storage device 6 (e.g., memory devices 16). When storage device 6 represents a HDD, controller 8 may not necessarily include maintenance module 26 or may include a maintenance module that performs defragmenting or other maintenance operations.

Scheduling module 30 of controller 8 may schedule operations to be performed by memory devices 16. For instance, scheduling module 30 may cause one or more of memory devices 16 to perform one or more operations based on requests received from other components of controller 8. In some examples, scheduling module 30 may cause a particular memory device of memory devices 16 to perform one or more operations by causing hardware engine 32 to output commands to the particular memory device. As one example, scheduling module 30 may permit hardware engine 32 to output commands that cause memory device 16Aa to store data.

As described above, controller 8 may perform various aspects of the seamless stream collision detection techniques described in this disclosure. In some examples, write module 24 of controller 8 may detect the stream collision during processing of a write request received via interface 14 from host 4. The write request may, as described above, conform to an NVMe protocol (which may also be referred to as an NVMe specification). Per the NVMe protocol, the write request may identify a stream to which the data of the write request is be written. The write request may identify the stream using a stream identifier ("stream ID") and identify a logical block address to which the data is to be written.

To detect the stream collision, write module 24 may interface with address translation module 22 to retrieve an entry of indirection table 23 associated with the logical block address of the write request. The entry of indirection table 23 associated with the logical block address of the write request may specify a physical block address (or, in some examples, a blockset identifier—ID—from which the physical block address may be determined) associated with the logical block address, the stream ID, and a block sequence number (BSN) associated with the corresponding blockset ID.

In some instances, indirection table 23 may store a certain subset of the above referenced blockset ID, stream ID and BSN, while another data structure or table may store the remaining information. For example, indirection table 23 may store an association between the LBA and a blockset ID, which may represent a unique identifier assigned to each available blockset of memory devices 16. Another table referred to as a blockset descriptor table may store an association between the blockset ID and the stream ID, and an association between the blockset ID and the BSN. In this disclosure, it is assumed that indirection table 23 refers to one or more tables used for storing the above described associations. As such, indirection table 23 may, in the instances where a blockset descriptor table is utilized separate from an actual virtual to physical (V2P) table storing the association between LBAs and blockset IDs, also refer to the blockset descriptor table.

As shown in FIG. 2, address translation module 22 may also, in accordance with the seamless stream management techniques described in this disclosure, store a stream mapping table 25. Stream mapping table 25 may store, for open streams, an association between BSNs and stream IDs identifying the open streams. Write module 24 may interface with address translation module 22 to access stream mapping table 25 in order to identify a stream ID associated to the open BSN.

Write module 24 may next compare the stream ID associated with the corresponding blockset ID (which may be referred to as the "previous stream ID") with the stream ID specified by the write request (which may be referred to as the "current stream ID"). When the previous stream ID is different than the current stream ID, write module 24 may determine that a stream collision has occurred.

The stream collision may occur when the previous stream is either open or closed. As such, stream collisions are not premised upon the closure of the previous stream, but rather on whether the blockset associated with the previous stream (which may be referred to as the "previous blockset") is still open when writing the second version of the LB to the current stream. In other words, host 4 may close the previous stream but not fill up the entire previous blockset. Controller 8 may reassign the previous blockset to a different stream, at which point a stream collision may still occur even though the previous stream has been closed. In this respect, controller 8 may determine whether a stream collision has occurred only when the previous blockset is still open.

In response to determining that a stream collision has occurred, write module 24 may interface with address translation module 22 to access stream mapping table 25 using the current stream ID as a key to determine the BSN associated with the current stream ID. Write module 24 may next compare the BSN associated with the previous stream ID to the BSN associated with the current stream ID. When the BSN associated with the previous stream ID is greater than or equal to the BSN associated with the current stream ID, write module 24 may store the data (which may also be referred to as the "logical block") of the write request to the previous stream ID and not the current stream ID (contrary to the write request). When the BSN associated with the previous stream ID is less than the BSN associated with the current stream ID, write module 24 may store the logical block to the current stream ID.

Figure 3:
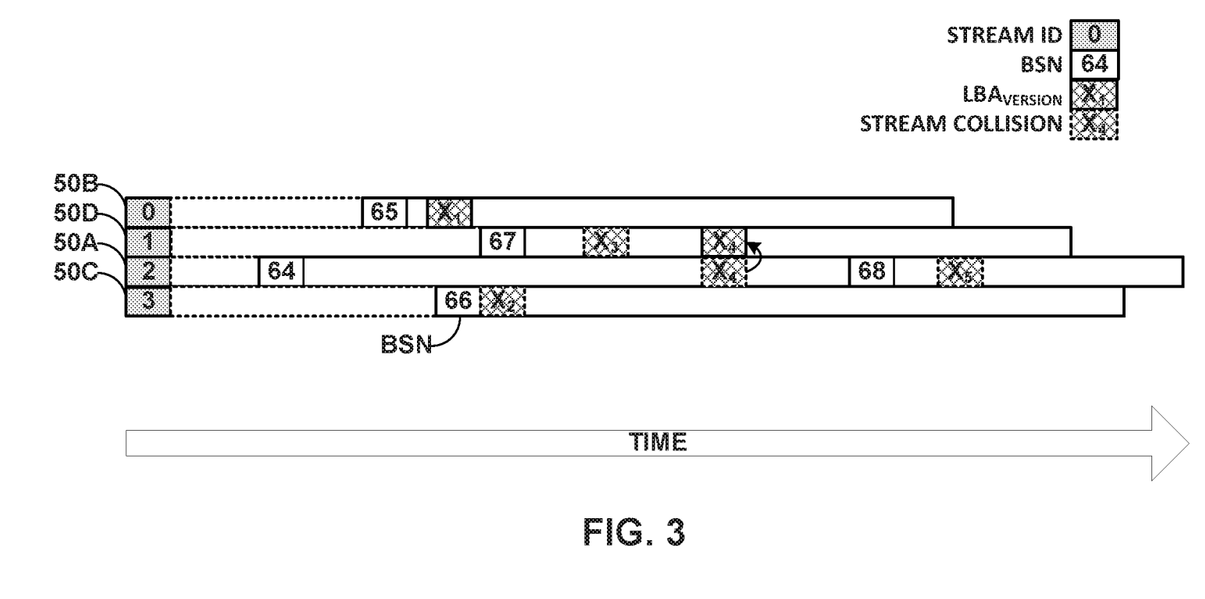
FIG. 3 is a conceptual and schematic block diagram illustrating example details of a resource provisioning table, in accordance with one or more techniques of this disclosure.

FIG. 3 is a diagram illustrating example operation of controller 8 of SSD 6 in performing the seamless stream management techniques described in this disclosure. In the example of FIG. 3, controller 8 may initialize a blockset with a BSN of 64 ("BSN 64"), the blockset with BSN 64 associated to a stream 50A identified by a stream ID of two (2). Next, controller 8 may initialize a blockset with a BSN of 65 ("BSN 65"), the blockset with BSN 65 associated with a stream 50B identified by a stream ID of zero (0). Address translation module 22 may update stream mapping table 25 to reflect that stream ID 2 is associated with BSN 64, while stream ID 0 is associated with BSN 65. Address translation module 22 may also update physical blocks of each of BSNs 64 and 65 within indirection table 23 to reflect that the corresponding physical blocks (by way of blockset IDs) are associated with BSNs 64 and 65.

After initializing the blockset with BSN 65, controller 8 may receive a write request requesting that an LB associated with an LBA of X ("LBA X") be written to stream ID 0 (and thus, stream 50B). Controller 8 may invoke write module 24, which may determine whether the write request results in a stream collision in the manner described above. Write module 24 may, in this instance, determine that the write request does not result in a stream collision, and write LB associated with LBA X to one of the physical blocks of the blockset identified by BSN 65. The write LBA X is shown as $X_1$ to denote that a first version (1) of LBA X was written to a physical block of the blockset identified by BSN 65. Write module 24 may interface with address translation module 22 to update indirection table 23 with the write of LBA $X_1$ to one of the physical blocks associated with the blockset identified by BSN 65.

Controller 8 may, when writing the first version of LB associated with LBA X, also initialize a blockset with a BSN of 66 ("BSN 66"), the blockset with BSN 66 associated to a stream 50C identified by a stream ID of three (3). Address translation module 22 may update stream mapping table 25 to associate stream ID 3 with BSN 66.

After initializing the blockset with BSN 66, controller 8 may receive a write request requesting that an LB associated with an LBA of X ("LBA X") be written to stream ID 3 (and thus, stream 50C). Controller 8 may invoke write module 24, which may determine whether the write request results in a stream collision in the manner described above. Write module 24 may, in this instance, determine that the write request results in a stream collision considering that LBA X has been previously written to stream 50B identified by stream ID 0, and that the blockset associated with stream 50B is still open.

Write module 24 may, in response to determining that a stream collision has occurred, interface with address translation module 22 to determine, from indirection table 23, the BSN associated with stream ID 0 to which the previous version of LBA X was written (using the blockset ID associated with the blockset to which the previous version of the LBA X was written). As such, write module 24 determines the previous BSN as BSN 65. Write module 24 also interfaces with address translation module 22 to identify, from stream mapping table 25, the BSN of the target stream to which the second version of LBA X is to be written using stream ID 3 specified in the write request. Write module 24, in this example, determines the target BSN as BSN 66. Write module 24 compares previous BSN 65 to target BSN 66. Given that target BSN 66 is greater than previous BSN 65, write module 24 writes a second version of the LB associated with LBA X to stream 50C. The second version of LB written to LBA X is shown as "$X_2$" in the example of FIG. 3.

Controller 8 may, when writing the second version of the LB associated with LBA X, also initialize a blockset with BSN 67, the blockset with BSN 67 associated with a stream 50D identified by a stream ID of one (1). Address translation module 22 may update stream mapping table 25 to associate stream ID 1 with BSN 67.

After initializing stream 50D, controller 8 may receive a write request requesting that an LB associated with LBA of X ("LBA X") be written to stream ID 1 (and thus, stream 50D). Controller 8 may invoke write module 24, which may determine whether the write request results in a stream collision in the manner described above. Write module 24 may, in this instance, determine that the write request results in a stream collision considering that LBA X has been previously written to stream 50C identified by stream ID 3, and the blockset with BSN 66 of stream 50C has not yet been closed.

Write module 24 may, in response to determining that a stream collision has occurred, interface with address translation module 22 to determine, from indirection table 23, the BSN associated with stream ID 3 to which the previous version of LBA X was written (using the logical address of the write request to identify a blockset ID of the previous blockset, which may then be used to lookup the previous BSN). As such, write module 24 determines the previous BSN as BSN 66. Write module 24 also interfaces with address translation module 22 to identify, from stream mapping table 25, the BSN of the target stream to which the third version of LBA X is to be written using stream ID 1 specified in the write request. Write module 24, in this example, determines the target BSN as BSN 67. Write module 24 compares previous BSN 66 to target BSN 67. Given that target BSN 67 is greater than previous BSN 66, write module 24 writes a third version of the LB associated with LBA X to stream 50D. The third version of LB written to LBA X is shown as "$X_3$" in the example of FIG. 3.

Controller 8 may receive another write request requesting that an LB associated with LBA of X ("LBA X") be written to stream ID 2 (and thus, stream 50A). Controller 8 may invoke write module 24, which may determine whether the write request results in a stream collision in the manner described above. Write module 24 may, in this instance, determine that the write request results in a stream collision considering that LBA X has been previously written to stream 50D identified by stream ID 1, and the blockset associated with stream 50D has not yet been closed.

Write module 24 may, in response to determining that a stream collision has occurred, interface with address translation module 22 to determine, from indirection table 23, the BSN associated with stream ID 1 to which the previous version of LBA X was written (using the logical address of the write request to identify a blockset ID of the previous blockset, which may be used to lookup the previous BSN). As such, write module 24 determines the previous BSN as BSN 67. Write module 24 also interfaces with address translation module 22 to identify, from stream mapping table 25, the BSN of the target stream to which the fourth version of LBA X is to be written using stream ID 2 specified in the write request. Write module 24, in this example, determines the target BSN as BSN 64. Write module 24 compares previous BSN 67 to target BSN 64. Given that target BSN 64 is less than previous BSN 67, write module 24 writes a fourth version of the LB associated with LBA X to stream 50D (and not to stream 50A as requested by the write request so as to allow for successful playback during initialization of SSD 6). The fourth version of LB written to LBA X is shown as "$X_4$" in the example of FIG. 3.

Controller 8 may, after writing the fourth version of the LB associated with LBA X, initialize a blockset with BSN 65, the blockset with BSN 65 associated to stream 50A. Address translation module 22 may update stream mapping table 25 to associate stream ID 1 with BSN 68, replacing the association with stream ID 1 with BSN 64.

Controller 8 may next receive a write request requesting that an LB associated with LBA of X ("LBA X") be written to stream ID 2 (and thus, stream 50A). Controller 8 may invoke write module 24, which may determine whether the write request results in a stream collision in the manner described above. Write module 24 may, in this instance, determine that the write request results in a stream collision considering that LBA X has been previously written to stream 50D identified by stream ID 1, and the blockset of stream 50D has not yet been closed.

Write module 24 may, in response to determining that a stream collision has occurred, interface with address translation module 22 to determine, from indirection table 23, the BSN associated with stream ID 1 to which the previous version of LBA X was written (using the logical address of the write request to identify a blockset ID of the previous blockset, which may be used to lookup the previous BSN). As such, write module 24 determines the previous BSN as BSN 67. Write module 24 also interfaces with address translation module 22 to identify, from stream mapping table 25, the BSN of the target stream to which the third version of LBA X is to be written using stream ID 2 specified in the write request. Write module 24, in this example, determines the target BSN as BSN 68. Write module 24 compares previous BSN 67 to target BSN 68. Given that target BSN 68 is greater than previous BSN 67, write module 24 writes a fifth version of the LB associated with LBA X to stream 50A. The fifth version of LB written to LBA X is shown as "$X_5$" in the example of FIG. 3.

Figure 4:
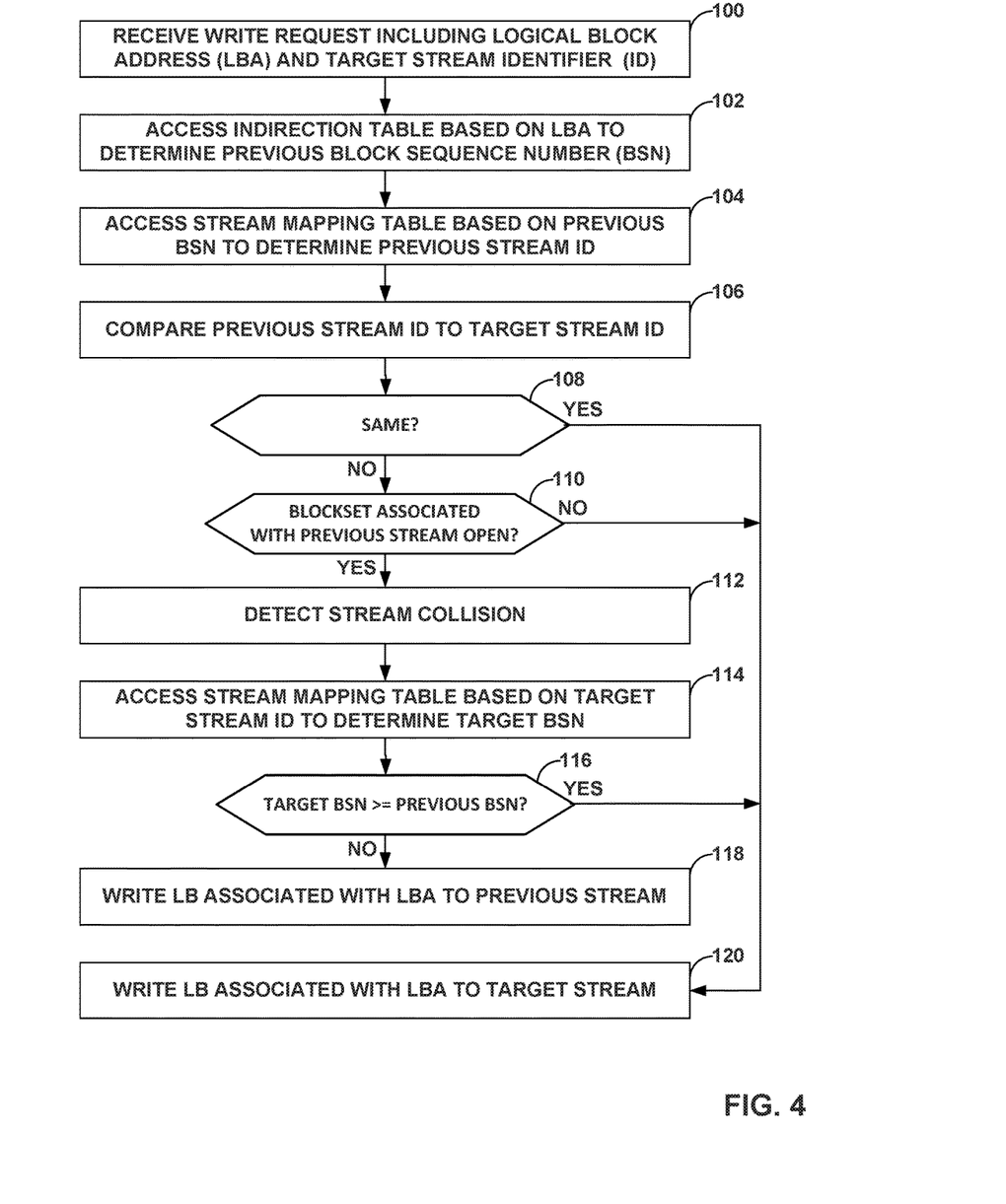
FIG. 4 is a flow diagram illustrating an example technique for controlling access to logical units of a data storage device, in accordance with one or more techniques of this disclosure.

FIG. 4 is a flowchart illustrating exemplary operation of controller 8 of SSD 6 shown in FIG. 2 in performing the seamless stream management techniques described in this disclosure. As described in more detail above, write module 24 of controller 8 may detect the stream collision during processing of a write request received via interface 14 from host 4.

Write module 24 may first receive a write request including a logical block address (LBA) and a target stream ID (100). To detect the stream collision, write module 24 may interface with address translation module 22 to retrieve an entry of indirection table 23 associated with the logical block address of the write request in order to determine a previous block sequence number (BSN), as described in more detail above (102). Write module 24 may interface with address translation module 22 to access stream mapping table 25 based on the previous BSN to identify a previous stream ID associated to the previous BSN (104).

Write module 24 may next compare the previous stream ID with the target stream ID specified by the write request (106). When the previous stream ID is not the same as the current stream ID ("NO" 108), write module 24 determines whether the blockset associated with the previous stream ID is still open (110). When write module 24 determines that the previous and current stream IDs are different and that the blockset associated with the previous stream ID is still open ("YES" 110), write module 24 detects a stream collision (112).

In response to detecting the stream collision, write module 24 may interface with address translation module 22 to access stream mapping table 25 using the target stream ID as a key to determine the target BSN associated with the target stream ID (114). Write module 24 may next compare the previous BSN to the target BSN. When the target BSN is not greater than or equal to the previous ("NO" 116), write module 24 may store the data (which may also be referred to as the "logical block") of the write request to the previous stream and not the current stream ID (contrary to the write request) (118).

When the target BSN is greater than or equal to the previous BSN, write module 24 may store the logical block to the current stream ID (120). Likewise, when write module 24 determines that the previous stream ID is the same as the target stream ID ("YES" 108) or, when write module 24 determines that the previous stream ID is not the same as the target stream ID ("NO" 108) but that the blockset associated with the previous stream is no longer open ("NO" 110), write module 24 may store the logical block to the current stream ID (120) considering that a stream collision did not occur.

Figure 5:
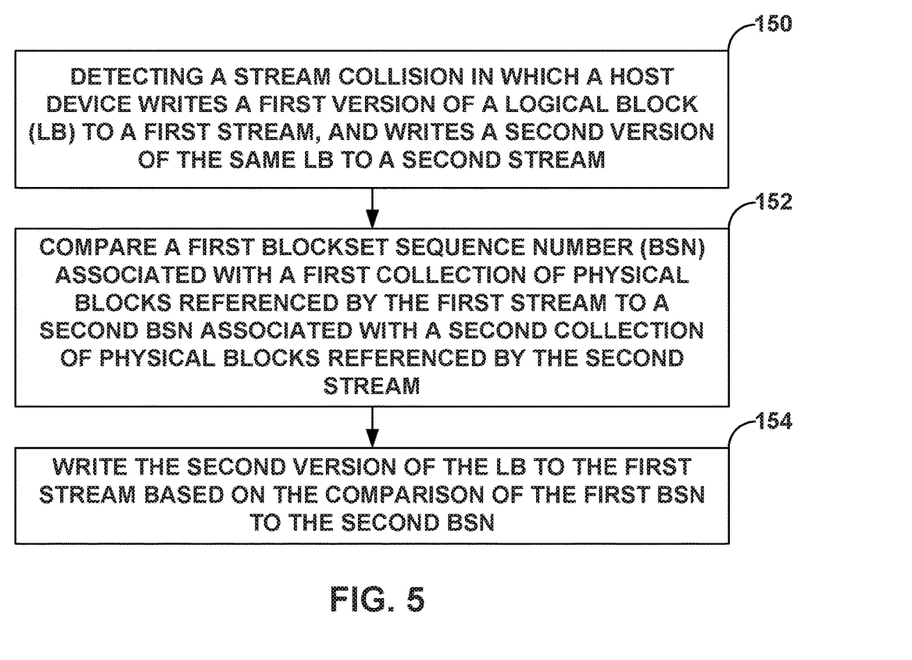
FIG. 5 is another flow diagram illustrating operation of a storage device in accordance with various aspects of the techniques described in this disclosure.

FIG. 5 is another flow diagram illustrating operation of a storage device in accordance with various aspects of the techniques described in this disclosure. A storage device, such as storage device 6 shown in the example of FIG. 1, may first detect a stream collision in which a host device writes a first version of a logical block (LB) to a first stream, and writes a second version of the same LB to a second stream (150). As described above, the first stream may reference a first collection of physical blocks of the storage device, and the second stream may reference a second collection of physical blocks of the storage device.

The storage device 6 may next compare a first blockset sequence number (BSN) associated with a first collection of physical blocks referenced by the first stream to a second BSN associated with a second collection of physical blocks referenced by the second stream (152). The storage device 6 may write the second version of the LB to the first stream based on the comparison of the first BSN to the second BSN (154).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
  receiving, by a storage device, a first write request for writing a first version of a logical block (LB) to a first stream associated with a first collection of physical blocks of the storage device;
  receiving, by the storage device, a second write request for writing a second version of the LB to a second stream associated with a second collection of physical blocks of the storage device;
  detecting, by the storage device, a stream collision based upon the first stream and the second stream being different;
  determining, by the storage device, in response to detecting the stream collision and before writing the second version of the logical block, which of the first stream and the second stream is more recent by comparing a first blockset sequence number (BSN) associated with the first collection of physical blocks to a second BSN associated with the second collection of physical blocks; and writing, by the storage device, the second version of the LB to the more recent one of the first stream or the second stream based on the comparison of the first BSN to the second BSN.

2. The method of claim 1, further comprising accessing an indirection table, based on a LB address (LBA) assigned to the LB and prior to the comparison of the first BSN to the second BSN, to determine the first BSN associated with the first collection of physical blocks to which the first version of the LB was written.

3. The method of claim 1, further comprising:
storing an association, to the first collection of physical blocks, between the first BSN and the first stream; and
accessing, based on the first BSN and prior to writing the second version of the LB, the association between the first BSN and the first stream to determine the first stream.

4. The method of claim 1, further comprising writing the second version of the LB to the first stream when the first BSN is greater than the second BSN.

5. The method of claim 1, wherein the first stream is identified by a first stream identifier and the second stream is identifier by a second stream identifier.

6. The method of claim 1, further comprising writing the second version of the LB to the second stream when the second BSN is greater than the first BSN.

7. The method of claim 1, further comprising:
receiving the first write request from a host device in accordance with an interface specification, the first write request requesting that the first version of the LB be written to the first stream; and
receiving the second write request from the host device in accordance with the interface specification, the second write request requesting that the second version of the LB be written to the second stream.

8. The method of claim 7, wherein the interface specification comprises a non-volatile memory (NVM) express (NVMe) interface specification.

9. The method of claim 1, wherein the storage device comprises a solid state storage device.

10. A storage device comprising:
a memory device; and
one or more processors configured to:
receive a first write request for writing a first version of a logical block (LB) to a first stream associated with a first collection of physical blocks of the storage device;
receive a second write request for writing a second version of the LB to a second stream associated with a second collection of physical blocks of the storage device;
detect a stream collision based upon the first stream and the second stream being different;
determine in response to detecting the stream collision and before writing the second version of the logical block, which of the first stream and the second stream is more recent by comparing a first blockset sequence number (BSN) associated with the first collection of physical blocks to a second BSN associated with the second collection of physical blocks; and
write, to the memory device, the second version of the LB to the more recent one of the to the first stream or the second stream based on the comparison of the first BSN to the second BSN.

11. The storage device of claim 10, wherein the one or more processors are further configured to access an indirection table, based on a LB address (LEA) assigned to the LB and prior to the comparison of the first BSN to the second BSN, to determine the first BSN associated with the first collection of physical blocks to which the first version of the LB was written.

12. The storage device of claim 10, wherein the one or more processors are further configured to:
store an association, to the first collection of physical blocks, between the first BSN and the first stream; and
access, based on the first BSN and prior to writing the second version of the LB, the association between the first BSN and the first stream to determine the first stream.

13. The storage device of claim 10, wherein the one or more processors are configured to write the second version of the LB to the first stream when the first BSN is greater than the second BSN.

14. The storage device of claim 10, wherein the first stream is identified by a first stream identifier and the second stream is identifier by a second stream identifier.

15. The storage device of claim 10, wherein the one or more processors are configured to write the second version of the LB to the second stream when the second BSN is greater than the first BSN.

16. The storage device of claim 10, wherein the one or more processors are further configured to:
receive the first write request from a host device in accordance with an interface specification, the first write request requesting that the first version of the LB be written to the first stream; and
receive the second write request from the host device in accordance with the interface specification, the second write request requesting that the second version of the LB be written to the second stream.

17. The storage device of claim 16, wherein the interface specification comprises a non-volatile memory (NVM) express (NVMe) interface specification.

18. The storage device of claim 10, wherein the storage device comprises a solid state storage device.

19. A non-transitory computer-readable storage medium encoded with instructions that, when executed, cause one or more processors of a storage device to:
receive a first write request for writing a first version of a logical block (LB) to a first stream associated with a first collection of physical blocks of the storage device;
receive a second write request for writing a second version of the LB to a second stream associated with a second collection of physical blocks of the storage device
detect a stream collision based upon the first stream and the second stream being different;
determine in response to detecting the stream collision and before writing the second version of the logical block, which of the first stream and the second stream is more recent by comparing a first blockset sequence number (BSN) associated with the first collection of physical blocks to a second BSN associated with the second collection of physical blocks; and
write the second version of the LB to the to the more recent one of the first stream or the second stream based on the comparison of the first BSN to the second BSN.

20. The non-transitory computer-readable storage medium of claim 19, further encoded with instructions that, when executed, cause the one or more processors to access an indirection table, based on a LB address (LEA) assigned to the LB and prior to the comparison of the first BSN to the second BSN, to determine the first BSN associated with the first collection of physical blocks to which the first version of the LB was written.

* * * * *